(12) United States Patent
Hou et al.

(10) Patent No.: US 10,528,252 B2
(45) Date of Patent: Jan. 7, 2020

(54) KEY COMBINATIONS TOOLBAR

(71) Applicant: VMware, Inc., Palo Alto, CA (US)

(72) Inventors: Sabrina Hou, Beijing (CN); Peng Guo, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 199 days.

(21) Appl. No.: 14/292,509

(22) Filed: May 30, 2014

(65) Prior Publication Data

US 2015/0347005 A1    Dec. 3, 2015

(51) Int. Cl.
*G06F 3/14*    (2006.01)
*G06F 3/0488*    (2013.01)

(52) U.S. Cl.
CPC .................. *G06F 3/04886* (2013.01)

(58) Field of Classification Search
CPC .................... G06F 3/14; G06F 3/17
USPC ........ 715/839, 863, 740; 345/169, 173, 168; 66/437; 382/115, 137; 726/30; 705/26.8
See application file for complete search history.

(56) References Cited

U.S. PATENT DOCUMENTS

| | | | | |
|---|---|---|---|---|
| 6,574,377 | B1* | 6/2003 | Cahill ............... | G06F 17/30017 382/137 |
| 7,706,574 | B1* | 4/2010 | Ross .................. | G06K 9/00154 382/115 |
| 2002/0173721 | A1* | 11/2002 | Grunwald ................ | A61B 8/00 600/437 |
| 2004/0239638 | A1* | 12/2004 | Swanson ................. | G06F 9/453 345/172 |
| 2010/0306706 | A1* | 12/2010 | Gill ........................ | G06F 3/0482 715/839 |
| 2012/0092277 | A1* | 4/2012 | Momchilov ............ | G06F 3/038 345/173 |
| 2012/0242581 | A1* | 9/2012 | Laubach .............. | G06F 3/04812 345/168 |
| 2013/0093682 | A1* | 4/2013 | Lindsay ............... | G06F 3/04886 345/169 |
| 2014/0283142 | A1* | 9/2014 | Shepherd .............. | G06F 3/0482 726/30 |
| 2015/0026586 | A1* | 1/2015 | Nylund ................. | G06F 3/0488 715/740 |
| 2015/0278922 | A1* | 10/2015 | Isaacson ............... | G06F 16/248 705/26.8 |
| 2016/0018913 | A1* | 1/2016 | Zhang ................... | G06F 3/0488 345/173 |

* cited by examiner

*Primary Examiner* — Ruay Ho
(74) *Attorney, Agent, or Firm* — Patterson + Sheridan, LLP

(57) ABSTRACT

Techniques permitting users to input keyboard key combinations via context menu shortcuts are provided. A context menu may be invoked by long-pressing a function key such as "Ctrl." The context menu includes key combination shortcuts associated with the pressed function key. For example, key combination shortcuts presented in the context menu for "Ctrl" may include "Ctrl+A," "Ctrl+C," "Ctrl+X," "Ctrl+V," and "Ctrl+Alt+Del." The user can input a desired key combination by tapping on an appropriate shortcut. The context menu may include default and/or user-specified key combinations. Default key combinations may be application or operating system specific. In addition, users may configure desired key combinations to be displayed in the context menu for a given function key.

16 Claims, 8 Drawing Sheets

KEY COMBINATIONS TOOLBAR

BACKGROUND

When a user remotely accesses an application configured for mouse-and-keyboard based commands, the user controls a particular server machine or a particular application remotely from his or her computing device. This type of interaction is commonly referred to as a "remote" session. For example, in a remote session, the video output data generated at the server machine may be routed to the user's computing device, where such video data includes a user interface (UI) of an operating system and/or applications executing on the host machine. Conversely, user input data received at the user's computing device may be routed to the server machine, where the operating system and/or applications interpret the routed input data as if the input data was received locally at the server machine. In remote sessions, it is not uncommon for users on mobile devices to use virtual keyboards to enter keyboard commands. Virtual keyboards typically present UIs which include a number of keys.

SUMMARY

One embodiment provides a method for performing a key combination operation. The method generally includes presenting a function toolbar, where the function toolbar includes a plurality of function keys. The method further includes, in response to receiving a long press event on one of the function keys, presenting a context menu which includes key combination shortcuts associated with the one of the function keys. In addition, the method includes executing an operation corresponding to the one of the key combination shortcuts in response to receiving a tap event on one of the key combination shortcuts.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Figure 1:
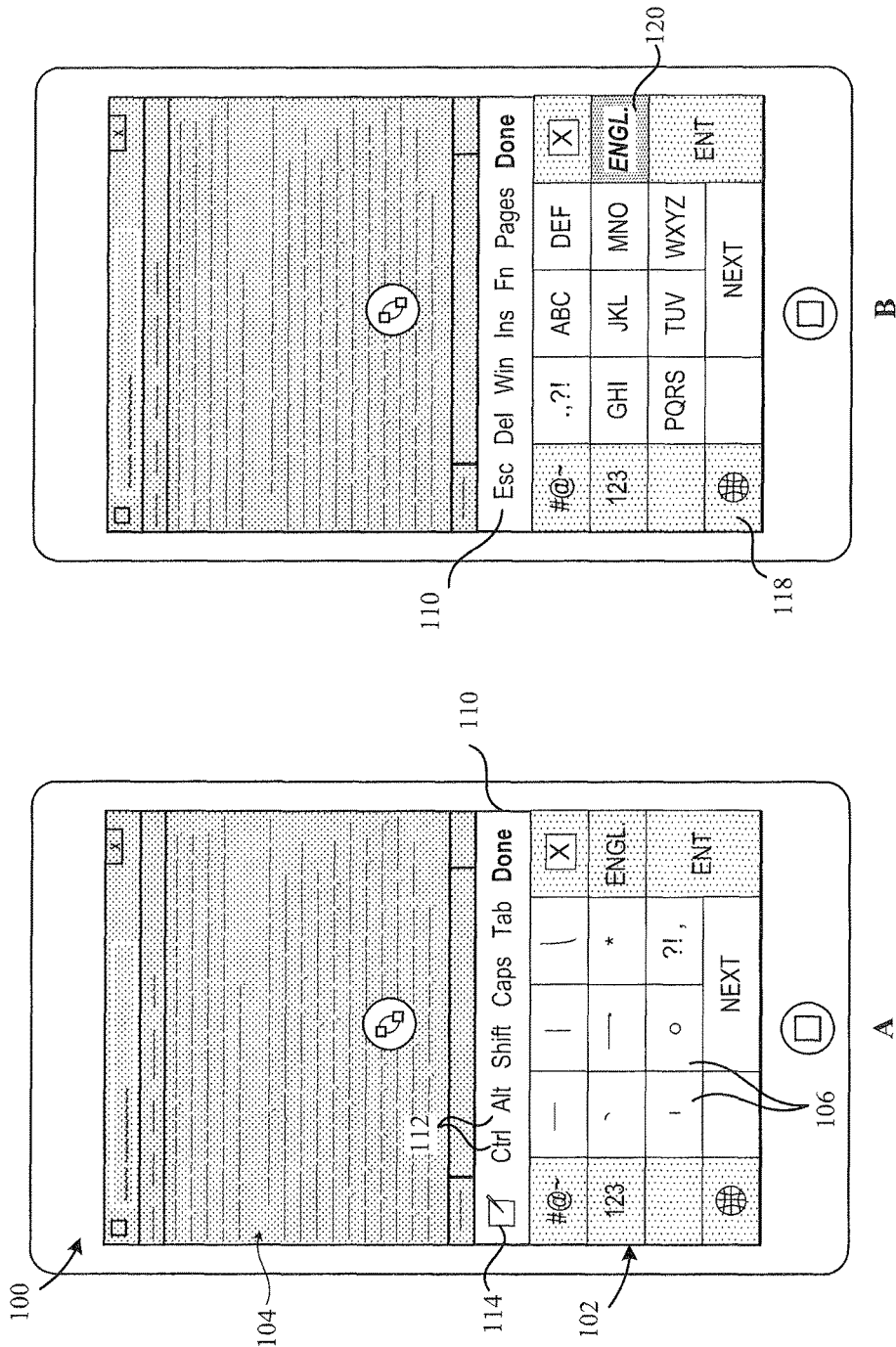
FIG. 1 depicts a graphical user interface (GUI) having a virtual keyboard configured to allow a user to enter keystroke input for a remote session, according to one embodiment of the present disclosure.

FIG. 1 depicts a graphical user interface 100 (GUI) having a virtual keyboard 102 configured to allow a user to enter keystroke input for a remote session, according to one embodiment of the present disclosure. Virtual keyboard 102 may be an onscreen keyboard having a plurality of keys 106 and may be rendered together with a GUI 104 of the remote session, e.g., an application running in the remote session. Touch input (e.g., tapping and other gestures) performed on one or more keys 106 of virtual keyboard 102 may be translated to keyboard characters and other keystroke input and routed to a host machine providing a remote session.

As shown, the GUI 100 further includes a function key toolbar 110 configured to provide supplemental keyboard functionality to virtual keyboard 102. The function key toolbar 110 is described herein primarily as a separate toolbar from the virtual keyboard 102, but in some embodiments the function key toolbar may also be integrated in the virtual keyboard 102. Function key toolbar 110 may include a plurality of keys, referred to collectively herein as function keys 112, including modifier keys (e.g., "Ctrl," "Alt," "Shift," "Fn," "Option," "Cmd") that temporarily modify the action of another key when pressed together; editing keys (e.g., "Del," "Ins"); navigation keys (e.g., "Page Up," "Page Down," "Home," "End"); lock keys (e.g., "Scroll Lock," "Num Lock," "Caps Lock"); function keys (e.g., "F1," "F2"); and other miscellaneous keys (e.g., "Esc," "Break"). Function key toolbar 110 may also include a pen icon 114 that provides a local input buffer which facilitates inputting a string of characters, for example, during times of poor network connection.

However, as shown in Panel A, in some cases, only a limited number of function keys can generally be displayed on the smaller screens of mobile devices, such as mobile phones. In order to enter certain key combinations, users may have to scroll through the function key toolbar 110 so that other function keys are displayed and the user can tap on the various appropriate function keys. For example, to enter the key combination "Ctrl+Alt+Del," which is typically used in the Windows® operating system to invoke a task manager application, the user must tap on the "Ctrl" and the "Alt" keys in the function key toolbar 110. In addition, the user must scroll the function key toolbar to display another set of function keys that includes the "Del" key and then tap the "Del" key. Some users may not even be aware that the function key toolbar can be scrolled, and may therefore be unable to input desired key combinations. As such, this process may be cumbersome and can be inconvenient for users.

Furthermore, inputting key combinations can be even more inconvenient for users of non-Latin-based virtual keyboards, such as the Chinese virtual keyboard depicted in FIG. 1. Key combinations useful for the remote session, such as "Ctrl+A," "Ctrl+C," "Ctrl+X," and "Ctrl+V" include Latin characters "a", "c", "x", and "v", respectively. If a user of a virtual keyboard configured for inputting Chinese characters (or any other a non-Latin character virtual keyboard) wants to input "Ctrl+A," the user must first switch to an input method configured for inputting Latin characters, such as an English language virtual keyboard (reached via world icon 116), or an English input mode of a Chinese virtual keyboard (reached via "Engl" key 118 and depicted in Panel B). Only then can the user input "Ctrl+A" by tapping on the "Ctrl" key in the function key toolbar 110 and also tapping on the "A" character key in the Latin-based virtual keyboard.

Accordingly, embodiments presented herein permit users to input keyboard key combinations via context menu shortcuts. As used herein, "key combination" refers to substantially simultaneous input of a combination of keys. In one embodiment, a user may invoke a context menu by performing a long-press (i.e., tap-and-hold) on a function key, and such a context menu may include one or more key combination shortcuts associated with the pressed function key. For example, a user may long-press the "Ctrl" key of a function key toolbar, and a context menu may be displayed that includes the following key combination shortcuts associated with the "Ctrl" key: "Ctrl+A," "Ctrl+C," "Ctrl+X," "Ctrl+V," "Ctrl+Alt+Del," etc. By tapping on one of these shortcuts, the user can input a desired key combination, without having to scroll through a function key toolbar to enter multiple function keys or changing from a non-Latin character virtual keyboard to an input method having Latin characters.

The particular key combination shortcuts that are included in the context menu may be for predetermined and/or user-determined key combinations. For example, the context menu may include default key combinations that are statistically common, based on overall usage or for a given application, operating system, etc. Alternatively, the context menu may include key combinations which are automatically determined based on a particular user's usage patterns. In addition, users may be permitted to configure which key combinations will be displayed in the context menu when the user long-presses a given function key. This allows users to override default key combinations with their own desired key combinations.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 2A:
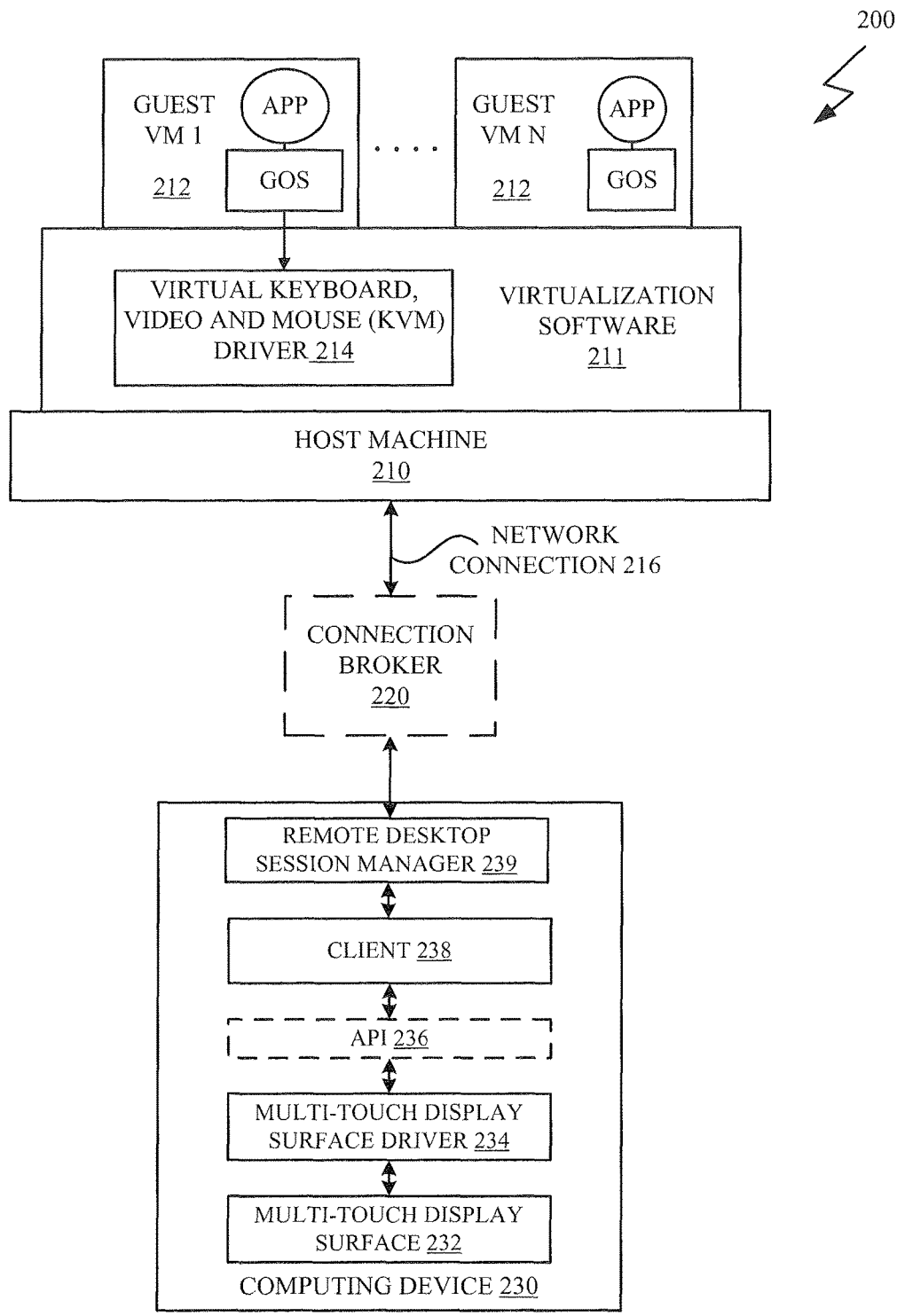
FIG. 2A is a block diagram of a computing device connected through a network to a host machine to provide a remote session, according to an embodiment.

FIG. 2A is a conceptual diagram 200 of a host machine 210 connected through a network 216 to a computing device 230 that provides a remote session. Host machine 210 may comprise a general purpose computer system having one or more applications, virtual machines, or other entities. While the description below shows by way of example a remote access of a virtual machine running on a remote host using a client device having a touch interface, it should be recognized that the embodiments of the present disclosure may be used in any UI remoting application, including, for example, terminal services providing remote access to individual desktop applications, remote control applications where a user may want to remotely access their home or work physical computer system, desktop support applications in which a user allows an administrator to remotely access their desktop PC, etc.

In one embodiment, host machine 210 includes a virtualized computer system having a plurality of guest virtual machines 212 (VMs), wherein each guest VM 212 is a virtual machine implemented by virtualization software 211, or a component thereof. A virtual keyboard, video, and mouse (KVM) driver 214 implements, for a particular one of guest VMs 212, virtual user interface devices and communicates user inputs and system outputs (such as display and audio information) to remote computing device 230.

Each guest VM may include a guest operating system (GOS) and one or more applications (APP). The guest operating system may be a commodity operating system such as Microsoft Windows® or a specialized operating system designed specifically to work with virtualization software 211 (sometimes referred to as a "paravirtualized OS"). In one embodiment, virtualization software 211 is stored on a physical data storage medium (not shown) forming part of host machine 210, whereas virtual disks (not shown) for each guest virtual machine are mapped by virtualization software 211 to files that may be stored remotely or locally.

Computing device 230 communicates with host machine 210 using the network 216 such that IO data may be communicated between computing device 230 and host machine 210. An optional connection broker 220 may be disposed between computing device 230 and host machine 210 to, for example, facilitate enhanced authentication and security features and/or provide simplified or customized connectivity options.

Computing device 230 may execute a client 238 that is configured to facilitate a remote session with one of guest VMs 212. Computing device 230, which may not have a mouse or keyboard attached, is configured to provide mouse-and-keyboard based commands to an application designed to accept such commands. The application may execute remotely as shown in FIG. 2A, or the application may execute locally on computing device 230, e.g., a guest operating system executing in a virtual machine, as described in detail below in conjunction with FIG. 3A.

Multi-touch display surface driver 234 manages multi-touch display surface 232 included in computing device 230 and provides user input information to applications executing on computing device 230. API 236 exposes a set of functions that assist client 238 in processing user input received via multi-touch display surface 232. For example, client 238 may be notified via API 236 of a particular gesture-based user input occurring when a user places a finger or other input object (e.g., stylus) into contact with multi-touch display surface 232. Alternatively, client 238 may circumvent API 236 and instead continually monitor activity of multi-touch display surface driver 234 to process user input made to multi-touch display surface 232. Client 238 is in communication with remote desktop session manager 239, which manages the remote session between computing device 230 and a guest VM 212 executing on host machine 210.

In a remote session, remote desktop session manager 239 receives video output data generated by the guest operating system of guest VM 212 and transmits the video output data to client 238. In turn, client 238 issues instructions to multi-touch display surface driver 234 to display the video output data and any video overlays that are generated by client 238, as described in further detail below. Input data is collected and processed at computing device 230 via multi-touch display surface 232, multi-touch display surface driver 234, and/or API 236, whereupon the input data is translated into mouse and/or keyboard commands by client 238 and transmitted to host machine 210 via remote desktop session manager 239. Upon receipt, virtualization software 211 passes the user input to virtual keyboard, video, and mouse driver 214, which injects the user inputs into the corresponding guest VM 212 using appropriate device drivers that are installed into the guest operating system. Display updates from guest VM 212 are received by virtual keyboard, video and mouse driver 214 and translated into an appropriate desktop remoting protocol and sent to computing device 230 to update the display thereon.

In one embodiment, client 238 may permit users to input keyboard key combinations via context menu shortcuts. As discussed in greater detail below, the user may invoke the context menu by long-pressing a function key such as "Ctrl," "Alt," etc., and the context menu that is then displayed may include key combination shortcuts associated with the pressed function key. The key combination shortcuts may also be either be predetermined (e.g., default key combinations) and/or user-determined key combinations (e.g., key combinations automatically determined based on statistical usage or key combinations manually configured by the user), and the different key combination shortcuts may be presented based on the foreground application and/or the operation system.

Figure 2B:
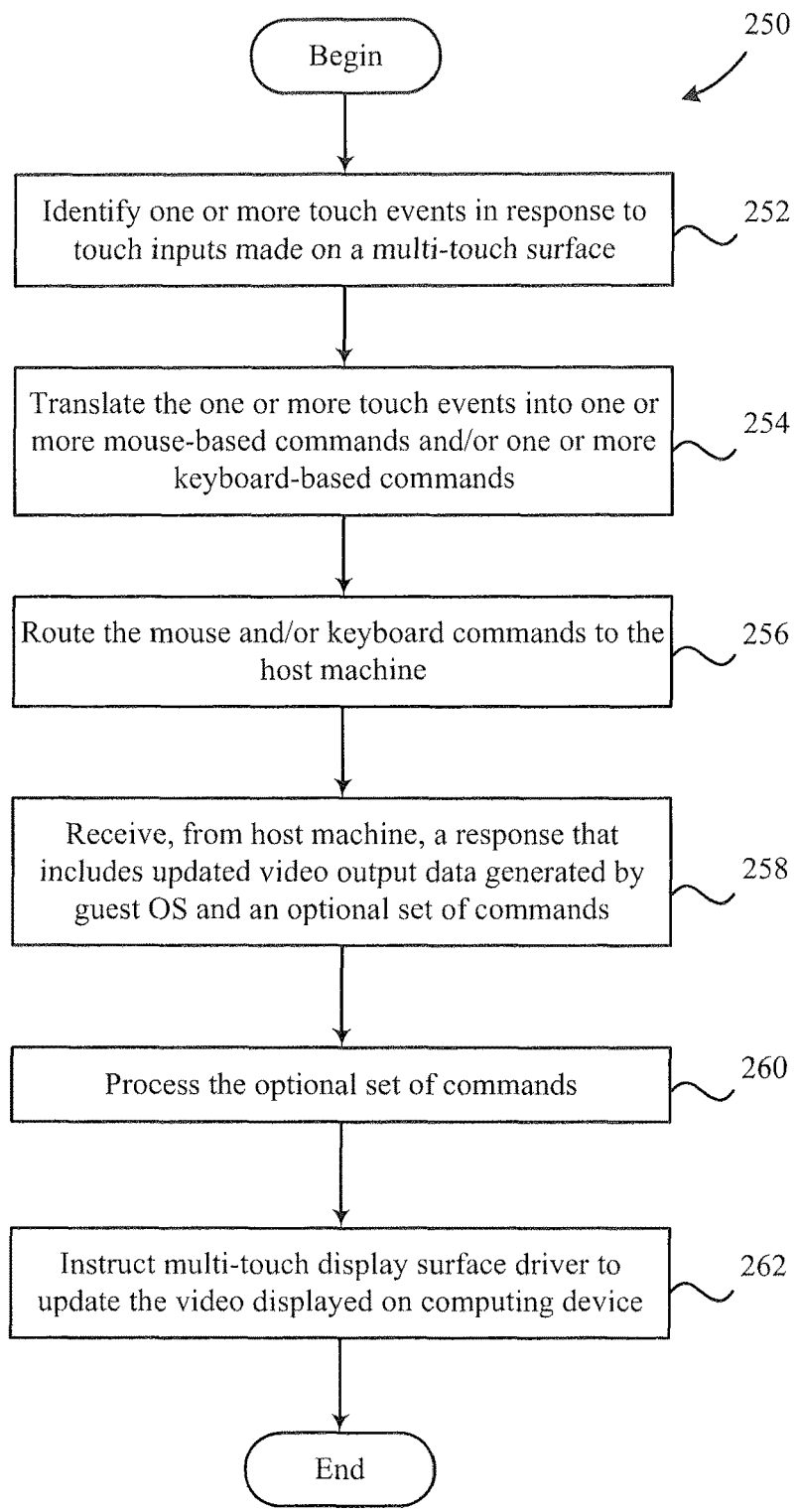
FIG. 2B is a flow diagram of method steps carried out by the computing device of FIG. 2A for translating multi-touch events into mouse and/or keyboard commands, according to an embodiment.

FIG. 2B is a flow diagram of an exemplary method 250 for transmitting and receiving remoting data between a multi-touch based remote machine and a mouse-and-keyboard based host machine, according an embodiment.

The method 250 begins at step 252, where client 238 identifies one or more touch events in response to touch inputs made on multi-touch display surface 232. At step 254, client 238 translates the one or more touch events into one or more mouse-based commands and/or one or more keyboard-based commands. In one embodiment, client 238 maintains a database in computing device 230 that associates one or more predefined touch events with a corresponding mouse-based command and/or keyboard based command. For example, a touch event on a predefined region of display surface 232 may be associated with a particular key press command.

At step 256, client 238 routes the mouse and/or keyboard commands to host machine 210. As described herein, client 238 communicates with host machine 210 using network 216, and may route such mouse and/or keyboard commands by including each in network packets that are addressed to host machine 210. At host machine 210, virtual keyboard and mouse driver 214 may inject the mouse and/or keyboard commands into the guest OS running in host machine 210. Alternatively, an application installed in the guest OS itself may inject the mouse and/or keyboard commands into the guest OS.

At step 258, client 238 receives, from host machine 210, a response that includes updated video output data and an optional set of commands. The video output data update is generated by the guest OS running in host machine 210 and detected by video and mouse driver 214 (or, alternatively, an application within guest OS itself). Video and mouse driver 214 then transmits the video output update to client 238 in the response, which may also include the optional set of commands.

At step 260, client 238 processes the optional set of commands. In one embodiment, the optional set of commands cause client 238 to perform specific tasks. For example, if the user selects a text input field located in a window UI, host machine 210 may include this information in the optional set of commands. Upon receipt of such an optional set of commands, client 238 may automatically initialize and display a virtual keyboard so that the user could easily provide textual input to the text input field. As another example, client 238 may display a virtual touchpad in response to an optional set of commands.

At step 262, client 238 instructs multi-touch display surface driver 234 to update the video displayed on computing device 230. In the examples described above in step 260, client 238 may instruct multi-touch display surface driver 234 to overlay the virtual keyboard and the virtual touchpad onto a UI. In an alternative embodiment, the virtual keyboard and virtual touchpad may simply be included in the UI itself received from host machine 210.

Figure 3A:
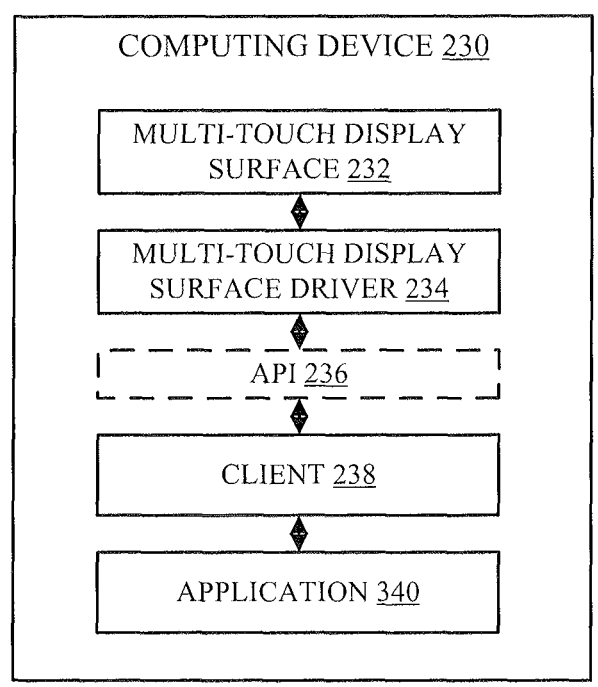
FIG. 3A is a block diagram showing components of a computing device that are used in translating multi-touch interface gestures to keyboard and/or mouse commands, according to an embodiment.

FIG. 3A is a block diagram of an application under control of computing device 230. In this embodiment, the application 340, which may include a virtual machine hosting a commodity operating system, is running locally on computing device 230, and is in communication with client 238. As described above, client 238 interacts with API 236 and/or multi-touch display surface driver 234 to manage user input received via multi-touch display surface 232 included in computing device 230. The user input data collected by multi-touch display surface driver 234 and/or API 236 is processed and translated by client 238 into mouse and keyboard commands that are transmitted to application 340 to emulate user input that is normally made to application 340 via a physical mouse and/or keyboard. In turn, application 340 transmits an updated user interface to client 238, which issues instructions to multi-touch display surface driver 234 to display the updated interface and any video overlays generated by client 238.

Figure 3B:
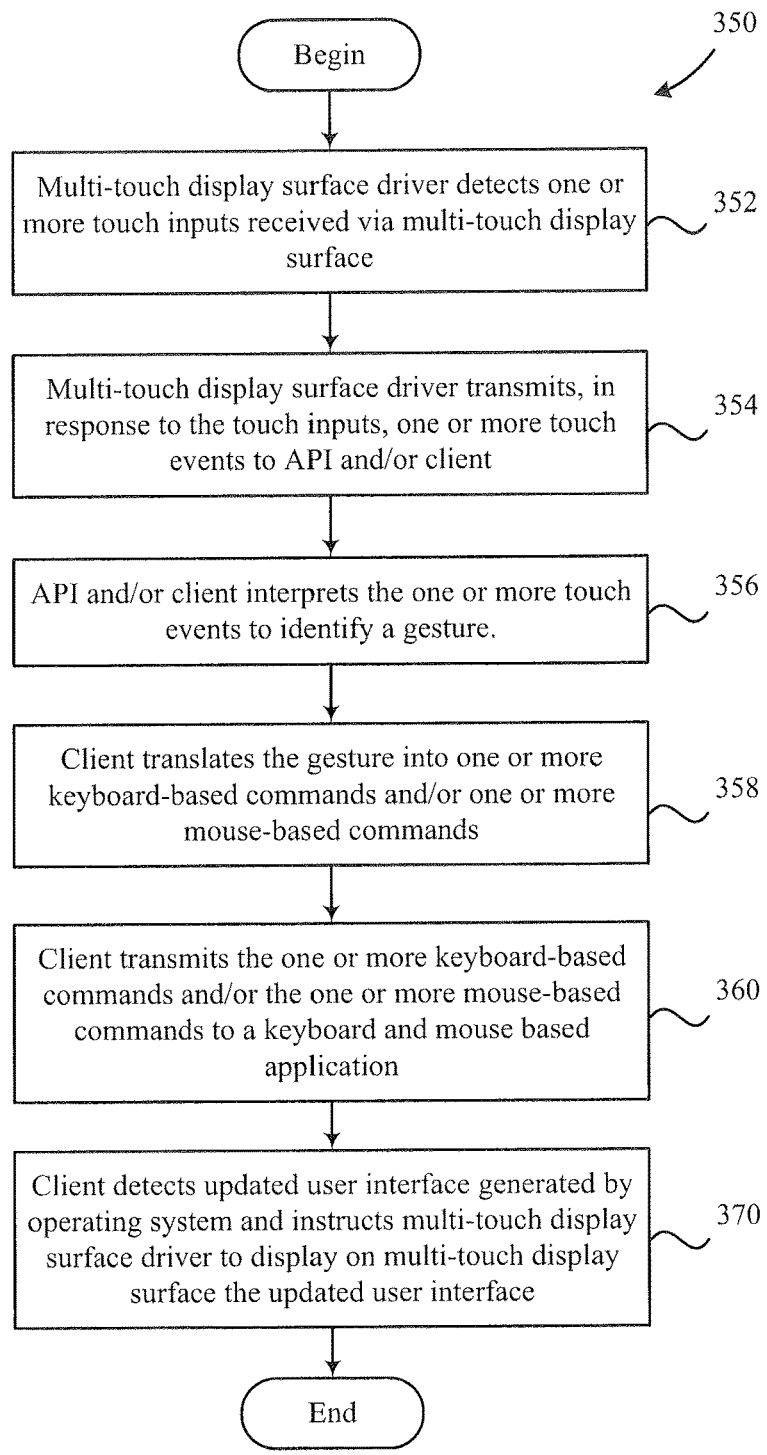
FIG. 3B is a flow diagram of method steps carried out by the computing device of FIG. 2A for translating multi-touch events into mouse and/or keyboard commands, according to an embodiment.

FIG. 3B is a flow diagram of method steps 350 for translating multi-touch events into mouse and/or keyboard commands, according to an embodiment. As shown, method 350 begins at step 352, where multi-touch display surface driver 234 detects one or more touch inputs received via multi-touch display surface 232. At step 354, multi-touch display surface driver 234 transmits, in response to the touch inputs, one or more touch events to listening applications, e.g., API 236 and client 238.

At step 356, API 236 and/or client 238 interprets the one or more touch events to identify a gesture. As described herein, client 238 may work alone or in conjunction with API 236 to process user input made to multi-touch display surface 232. At step 358, client 238 translates the gesture into one or more keyboard-based commands and/or one or more mouse-based commands, as described herein.

At step 360, client 238 transmits the one or more keyboard-based commands and/or the one or more mouse-based commands to a keyboard and mouse based application, such as an operating system executing on host machine 210. Such keyboard-based or mouse-based commands may cause the operating system to, e.g., update a user interface. At step 370, client 238 detects an updated user interface generated by the operating system and instructs multi-touch display surface driver 234 to display on multi-touch display surface 232 the updated user interface.

As discussed, client 238 may permit users to input keyboard key combinations via context menu shortcuts. For example, the user may invoke the context menu by long-pressing a function key, and the context menu that is then displayed may include predetermined and/or user-determined key combinations that are associated with the pressed function key. Different key combination shortcuts may be presented based on the foreground application and/or the operation system.

For purposes of illustration, the system of FIG. 2A in which computing device 230 has established a remote session with a guest VM 212 executing within host machine 210 is employed in the examples of FIGS. 4-6, below. However, it should be recognized that the system of FIG. 3A may also be employed.

Figure 4:
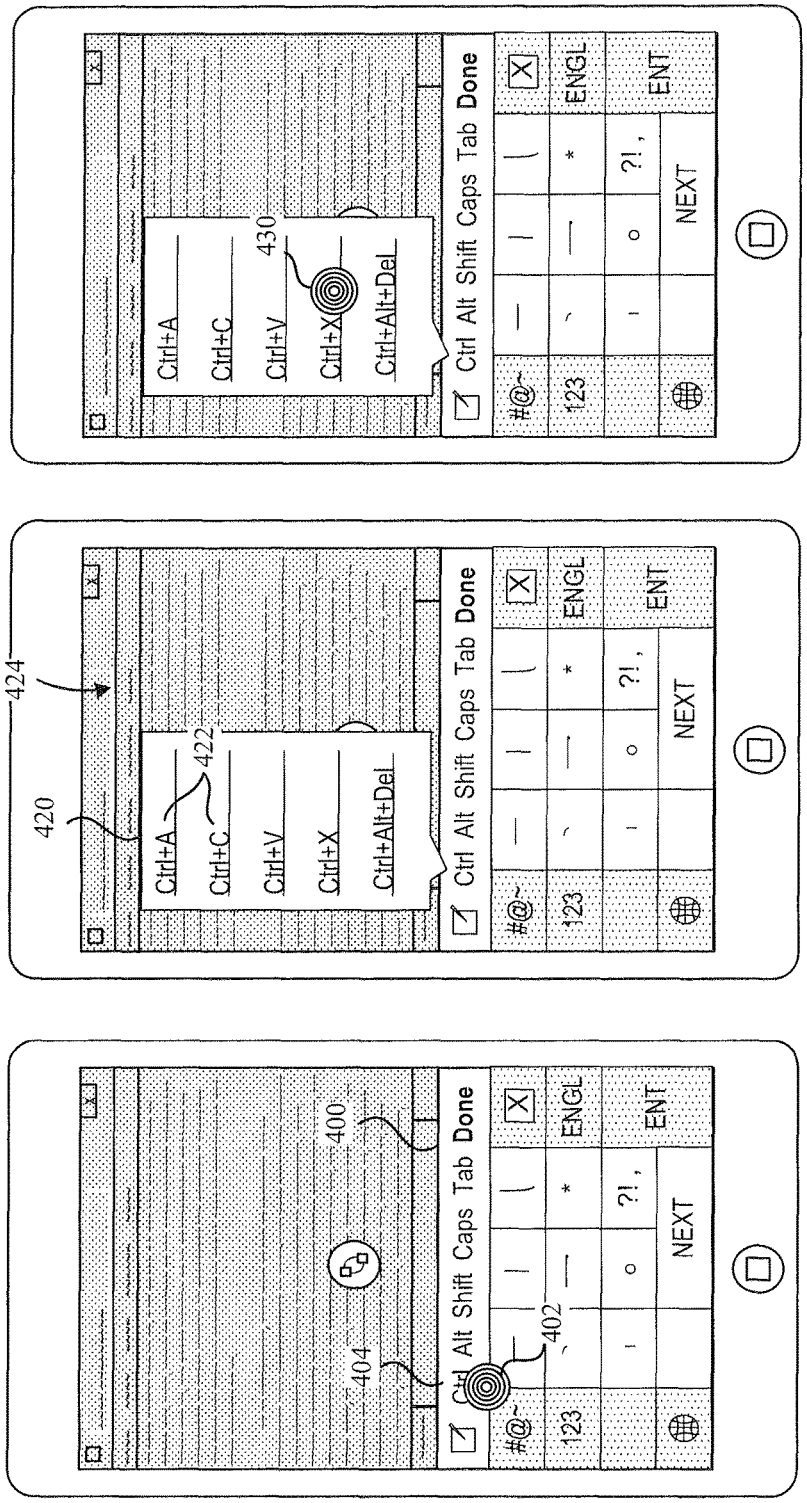
FIG. 4 illustrates exemplary operations for inputting key combinations using context menu shortcuts, according to an embodiment of the present disclosure.

FIG. 4 illustrates exemplary operations for inputting key combinations using context menu shortcuts, according to an embodiment of the present disclosure. As shown in Panel A, a user performs a long-press gesture (depicted as input 402) on a "Ctrl" key 404 of a function key toolbar 400. Function key toolbar 400 may be configured similar to function key toolbar 110 seen in FIG. 1, and may include any number of modifier keys, navigation keys, system command keys, and the like. As used herein, modifier keys include keys such as "Ctrl," "Shift," "Alt," "Fn," "Command," etc. that modify the actions of other keys when pressed together. Navigation keys include keys such as "Home," "End," "PageUp," "PageDown," arrow keys, etc. that can be used to move a pointer or cursor. System command keys include keys such as "Esc," "PRINT SCREEN," "Enter," menu key, etc. that are used to enter system commands. Some function keys may not be displayed in function key toolbar 400 until the user scrolls the toolbar 400 using, e.g., a swipe gesture. For example, function key toolbar 400 may initially display statistically commonly used function keys (e.g., "Ctrl," "Shift," "Tab," "Del," "Caps," "Win," "Alt," etc.), and the user may scroll function key toolbar 400 to access other function keys.

In response to a long press (or any other predefined gesture for interacting with the function toolbar) on one of the function keys, client 238 may instruct display surface driver 234 to display a context menu associated with the pressed function key. Panel B shows one such context menu 420 which is associated with the "Ctrl" key and includes key combination shortcuts 422 for "Ctrl+A" (select all), "Ctrl+C" (copy), "Ctrl+V" (paste), "Ctrl+X" (cut), and "Ctrl+Alt+Del" key combinations. In one embodiment, each of key combination shortcuts 422 in a context menu 420 may include the function key for which the context menu is invoked and one or more additional keys. For example, each of key combination shortcuts 422 in context menu 420 launched for the modifier key "Ctrl" include that modifier key "Ctrl" and one or more additional keys, namely, "A," "C," "V," "X," and "Alt" and "Del".

In one embodiment, key combination shortcuts 422 included in context menu 420 may be default shortcuts or shortcuts specified by a user. For example, context menu 420 may include shortcuts for statistically common key combinations. Such statistically common key combinations may be preprogrammed based on typical usage patterns for a given guest operating system and/or an application running thereon. That is, the key combinations that are displayed in context menu 420 may be context sensitive. Illustratively, a word processor application (e.g., Microsoft® Word) is running as a foreground application 424 within the remote session, and context menu 420 may present default key combination shortcuts associated with foreground application 424. For example, "Ctrl+A," "Ctrl+C," "Ctrl+V," "Ctrl+X," and "Ctrl+Alt+Del" may be key combinations commonly input by users of the word processor application, and client 238 may instruct display surface driver 234 to display context menu 420 having shortcuts for such key combinations. Alternatively, client 238 may determine statistically common key combinations from data collected about a specific user's usage patterns for the operating system and/or application. For example, a particular user may commonly input "Ctrl+A," "Ctrl+C," "Ctrl+V," and "Ctrl+X" key combinations, but not "Ctrl+Alt+Del," when using the word processor application, and client 238 may instruct display surface driver 234 to display context menu 420 with shortcuts for the commonly input key combination. In addition, the user may be permitted to override default context menu shortcuts with user-specified shortcuts, i.e., the context menus may be configurable according to user preferences.

After context menu 420 is displayed, the user may select a key combination by tapping on the corresponding shortcut (or performing any other appropriate gesture). For example, to select all text in a document, the user may long-press the "Ctrl" key in function key toolbar 410. The user may then tap on the "Ctrl+A" shortcut in context menu 420 that is displayed in response to the long-press of the "Ctrl" key, as shown in panel B. Note, the user does not need to switch from a non-Latin character virtual keyboard to a Latin character virtual keyboard to input "Ctrl+A." As another example, to execute a guest operating system task manager, such as Windows® Task Manager, the user may long-press the "Ctrl" key in function key toolbar 410 and then tap on a "Ctrl+Alt+Del" shortcut in context menu 420. Note, even though "Del" is not displayed at the same time as "Ctrl" and "Alt" in function key toolbar 410, the user does not need to scroll through function key toolbar 410 to find the "Del" key in order to input "Ctrl+Alt+Del."

In response to the user's tap on a key combination shortcut, client 238 transmits a command corresponding to the key combination to host machine 210. As discussed, virtualization software 211 running in host machine 210 may then pass the user input to virtual keyboard, video, and mouse driver 214, which may inject the user input into a guest VM using appropriate device drivers. Display updates from the guest VM may then be received by virtual keyboard, video and mouse driver 214 and translated into a desktop remoting protocol and sent to computing device 230 to update the display thereon. In the example shown in Panel C, the user taps the "Ctrl+X" key combination shortcut (depicted as input 430), and client 238 transmits keystroke input comprising the Ctrl modifier key and the character X to host machine 210. As a result of the keystroke input, a "Cut" action is performed within the guest VM, e.g., cutting some portion of text from the word processing application in the remote session. A display update reflecting changes to the word processing application is sent to computing device 230 for presentation to the user.

Figure 5:
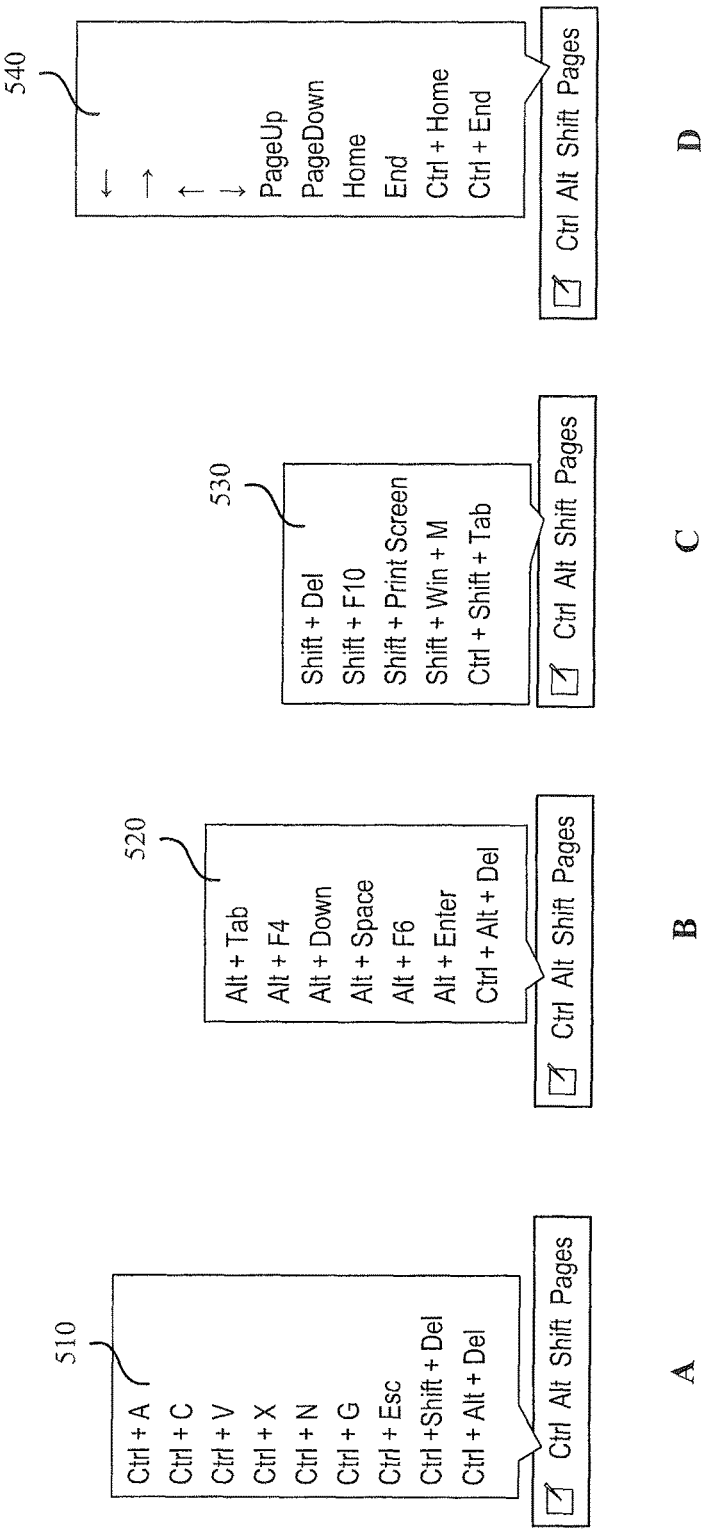
FIG. 5 illustrates example key combination context menus, according to an embodiment.

FIG. 5 illustrates example key combination context menus, according to an embodiment. As shown in panel A, an example context menu 510 which may be displayed in response to a long-press of the "Ctrl" key includes key combination shortcuts for "Ctrl+A," "Ctrl+C," "Ctrl+V," "Ctrl+X," "Ctrl+N," "Ctrl+G," "Ctrl+Esc," and "Ctrl+Shift+Del." Each of the key combination shortcuts in context menu 510 include "Ctrl" and one or more other keys. As discussed, the key combinations may be, e.g., statistically common key combinations or user-specified key combinations. After context menu 510 is displayed in response to the long-press on "Ctrl," the user may input a desired key combination by tapping on the appropriate shortcut in context menu 510.

Similar to panel A, panel B shows an example context menu 520 for the "Alt" key which includes key combination shortcuts for "Alt+Tab," "Alt+F4," "Alt+Down," "Alt+Space," "Alt+F6," "Alt+Enter," and "Ctrl+Alt+Del." Each of the key combination shortcuts in context menu 520 include "Alt" and one or more other keys. Panel C shows an example context menu 530 for the "Shift" key which includes key combination shortcuts for "Shift+Del," "Shift+F10," "Shift+PRINT SCREEN," "Shift+Win+M," and "Ctrl+Shift+Tab." Each of the key combination shortcuts in context menu 530 include "Shift" and one or more other keys. Panel D shows an example context menu 540 for the "Pages" key which includes key shortcuts for "→," "←," "↓," "↑," "PageUp," "PageDown," "Home," and "End."

Each of the key shortcuts in context menu 540 is a navigation key that can be used to move a pointer or cursor.

Figure 6:
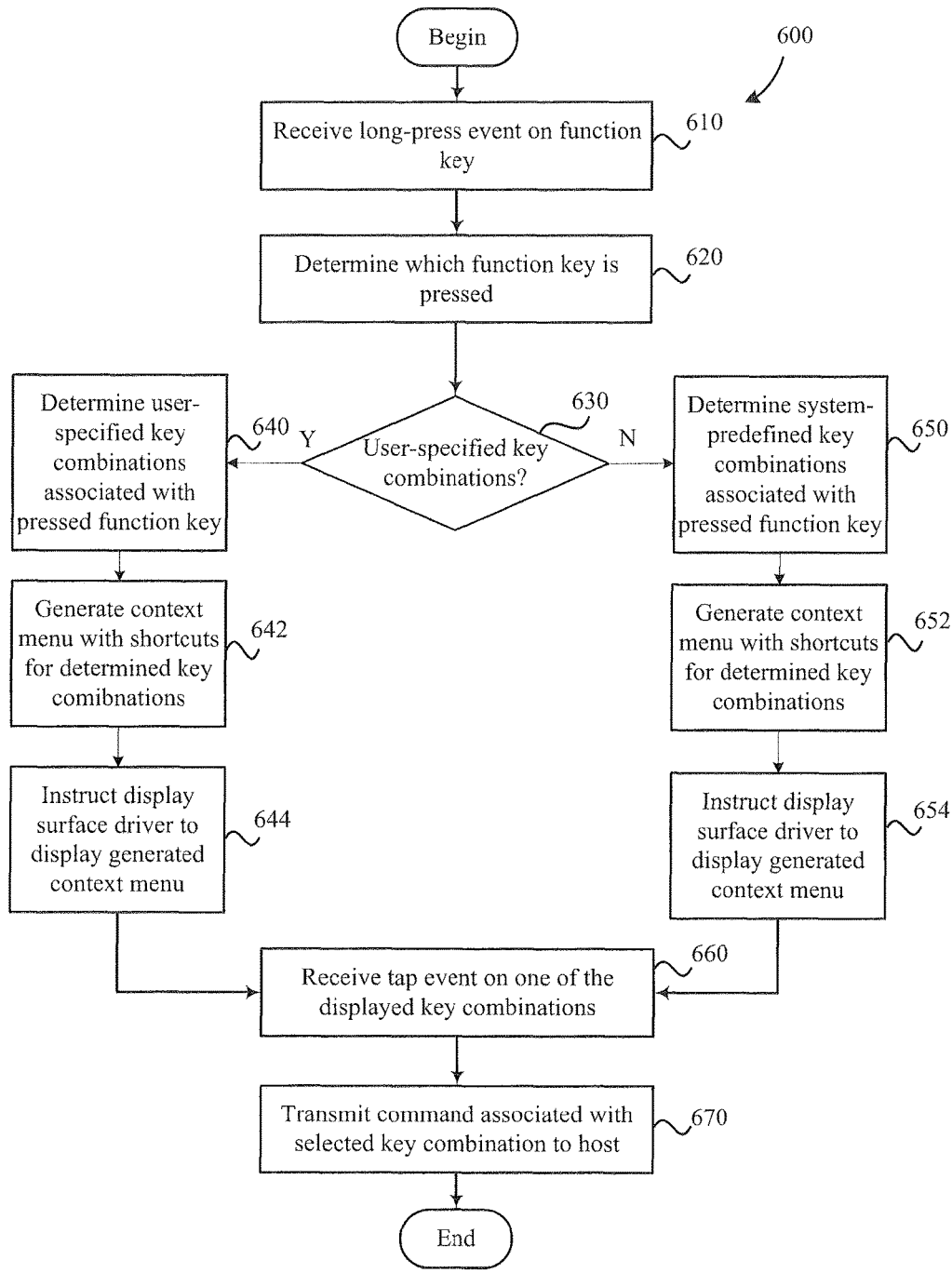
FIG. 6 illustrates a method for inputting key combinations, according to an embodiment.

FIG. 6 illustrates a method 600 for inputting key combinations, according to an embodiment. As shown, method 600 begins at step 610, where client 238 receives a long press event on a function key. Such a long press event may result from a tap and hold by a user of the device. At step 620, client 238 determines which function key is pressed. Client 238 may determine which function key is pressed based on, e.g., whether the press occurs within the boundaries of a displayed function key. In one embodiment, commonly used function keys (e.g., "Ctrl," "Shift," "Tab," "Del," "Caps," "Win," "Alt," etc.) may be presented to the user in a function key toolbar, and the user may scroll function key toolbar to see and press other function keys.

At step 630, client 238 determines whether there are user-specified key combinations (or keys). Each function key may be associated with default key combinations, and the user may also be permitted to override default key combinations with user-specified key combinations. Doing so permits user desired key combinations to be stored and presented in context menus.

If there are user-specified key combinations, then at step 640, client 238 determines the user-specified key combinations associated with the pressed key, as well as other key combinations associated with the pressed key (that may not be user-specified). As discussed, the key combinations associated with a given function key may include that function key and one or more other keys. For example, the function key may be "Ctrl" and the associated key combinations may include "Ctrl+A," "Ctrl+C," "Ctrl+X," "Ctrl+V," "Ctrl+Alt+Del," etc. In other cases, keys associated with a given function key may be related to the function key. For example, a function key "Pages" may be associated with the following keys: "→," "←," "↓," "↑," "PageUp," "PageDown," "Home," and "End."

Then, at step 642, client 238 generates a context menu with shortcuts for the key combinations determined at step 640. The context menu may be any feasible UI that includes the shortcuts. In one embodiment, user-specified key combination shortcuts (or keys) may be displayed in a context menu, similar to context menus 420 and 510-540 discussed above. At step 644, client 238 instructs display surface driver 234 to display the context menu generated at step 642.

If the user has not specified any key combinations (or keys), then at step 650, client 238 determines system-predefined key combinations associated with the pressed key. In one embodiment, such key combinations may include statistically common key combinations that are preprogrammed key combinations based on typical usage patterns, or automatically determined common key combinations based on the usage patterns of particular user(s). In another embodiment, the default key combinations that are displayed may be specific to a foreground application and/or operating system. For example, the key combination shortcuts may be different when a word processing application (e.g., Microsoft® Word) is the foreground application than when a spreadsheet application (e.g., Microsoft® Excel) is the foreground application. At step 652, client 238 generates a context menu with shortcuts for the key combinations determined at step 650. Then, at step 654, client 238 instructs display surface driver 234 to display the context menu generated at step 652.

At step 660, client 238 further receives a tap event on one of the displayed key combination shortcuts (or keys). Then, at step 670, client 238 transmits a command associated with the selected key combination (or key) to host machine 210.

Virtual mouse driver 214 running in host machine 210 may handle the transmitted command by injecting the user's input into guest VM 212 using a device driver of the guest OS. In response to such input, guest OS may itself act and/or transmit an event to an application running thereon which responds to the input. Then, virtualization software 211 running in host machine 210 may pass the user input to virtual keyboard, video, and mouse driver 214, which may inject the input into a guest VM. Display updates from the guest VM may then be received by virtual keyboard, video and mouse driver 214, translated into a desktop remoting protocol, and sent back to the user's device for display to the user.

Although discussed above primarily with respect to a remote desktop client, the function key toolbar described herein may generally be used with any touchscreen device. That is, techniques disclosed herein do not require a client for a remote desktop. For example, in some embodiments, the function key toolbar may be provided by an operating system of the touchscreen device itself or an application (other than a remote desktop client) running therein.

Advantageously, embodiments described herein provide shortcuts to key combinations so that users can input complicated key combinations without having to find and tap on multiple keys that make up the key combinations. In addition, some key combinations (e.g., "Ctrl+C," "Ctrl+X," "Ctrl+V") include Latin characters, and embodiments described herein allow users to input such key combinations without switching from a non-Latin-based virtual keyboard to a Latin-based virtual keyboard.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for performing a key combination operation on an operating system or application running in a virtual machine that is instantiated in a host machine that provides a remote virtual desktop of the virtual machine, comprising:

presenting a function toolbar on the remote virtual desktop of the virtual machine that is displayed on a client computing device that has a touch interface and is connected to the host machine over a network, wherein the function toolbar includes a plurality of function keys, each function key corresponding to a separate keyboard key;

in response to receiving a first touch input on one of the function keys, wherein the one of the function keys is identified by a displayed first character string comprising multiple characters:

determining, by the client computing device, that the first touch input is a tap and hold event;

based on the determining, displaying on the client computing device a context menu which includes a selectable shortcut displayed as an identifier of a combination of the one of the function keys and one or more other keys;

wherein the one or more other keys are identified by a displayed second character string of one or more characters;

wherein the identifier of the combination of the one of the function keys and one or more other keys comprises the displayed first character string and the displayed second character string; and wherein each of the one or more other keys corresponds to a separate keyboard key; and in response to receiving a second touch input on the selectable object, translating, by the client computing device, the second touch input into a keyboard-based command a simultaneous operation of the one of the function keys and the one or more other keys, and transmitting the keyboard-based command from the client computing device to the virtual machine over the network, such that the keyboard-based command is executed on the operating system or application running in the virtual machine.

2. The method of claim 1, wherein a virtual keyboard presented in conjunction with the function toolbar includes a non-Latin character user interface (UI), and wherein the first touch input and the second touch input are performed by a user without switching to a virtual keyboard with a Latin character UI.

3. The method of claim 1, wherein the selectable object indicates a shortcut for a user-specified key combination.

4. The method of claim 1, wherein the selectable object indicates a shortcut for a key combination associated with a foreground application.

5. The method of claim 1, wherein the selectable object indicates a shortcut for a statistically common key combination.

6. A non-transitory computer-readable storage medium embodying computer program instructions for performing a key combination operation on an operating system or application running in a virtual machine that is instantiated in a host machine that provides a remote virtual desktop of the virtual machine, the computer program instructions implementing operations comprising:

presenting a function toolbar on the remote virtual desktop of the virtual machine that is displayed on a client computing device that has a touch interface and is connected to the host machine over a network, wherein the function toolbar includes a plurality of function keys;

in response to receiving a first touch input on one of the function keys, wherein the one of the function keys is identified by a displayed first character string comprising multiple characters:

determining, by the client computing device, that the first touch input is a tap and hold event;

based on the determining, displaying on the client computing device a context menu which includes a selectable shortcut displayed as an identifier of a combination of the one of the function keys and one or more other keys;

wherein the one or more other keys are identified by a displayed second character string of one or more characters;

wherein the identifier of the combination of the one of the function keys and one or more other keys comprises the displayed first character string and the displayed second character string; and wherein each of the one or more other keys corresponds to a separate keyboard key; and in response to receiving a second touch input on the selectable object, translating the second touch input into a keyboard-based command associated with a simultaneous physical operation of the one of the function keys and the one or more other keys, and transmitting the keyboard-based command from the client computing device to the virtual machine over the network, such that the keyboard-based command is executed on the operating system or application running in the virtual machine.

7. The computer-readable storage medium of claim 6, wherein a virtual keyboard presented in conjunction with the function toolbar includes a non-Latin character user interface (UI), and wherein the first touch input and second touch input are performed by a user without switching to a virtual keyboard with a Latin character UI.

8. The computer-readable storage medium of claim 6, wherein the selectable object indicates a shortcut for a user-specified key combination.

9. The computer-readable storage medium of claim 6, wherein the selectable object indicates a shortcut for a key combination associated with a foreground application.

10. The computer-readable storage medium of claim 6, wherein the selectable object indicates a shortcut for a statistically common key combination.

11. A system, comprising:
a host machine that instantiates a virtual machine on which an operating system or application is running; and
a client computing device that is connected to the host machine over a network and comprising:
a processor; and
a memory, wherein the memory includes a program for reducing perceived read latency, the program being configured to perform operations for performing a key combination operation on the operating system or application running in the virtual machine, the operations comprising:
presenting a function toolbar on a remote virtual desktop of the virtual machine that is provided by the host machine and displayed on the client computing device having a touch interface, wherein the function toolbar includes a plurality of function keys, in response to receiving a first touch input on one of the function keys, wherein the one of the function keys is identified by a displayed first character string comprising multiple characters:
determining, by the client computing device, that the first touch input is a tap and hold event;
based on the determining, displaying on the client computing device a context menu which includes a selectable shortcut displayed as an identifier of a combination of the one of the function keys and one or more other keys;
wherein the one or more other keys are identified by a displayed second character string of one or more characters;
wherein the identifier of the combination of the one of the function keys and one or more other keys comprises the displayed first character string and the displayed second character string; and
wherein each of the one or more other keys corresponds to a separate keyboard key; and in response to receiving a second touch input on the selectable object, translating the second touch input into a keyboard-based command associated with a simultaneous physical operation of the one of the function keys and the one or more other keys, and transmitting the keyboard-based command from the client computing device to the virtual machine over the network, such that the keyboard-based command is executed on the operating system or application running in the virtual machine.

12. The system of claim 11, wherein a virtual keyboard presented in conjunction with the function toolbar includes a non-Latin character user interface (UI), and wherein the first touch input and second touch input are performed by a user without switching to a virtual keyboard with a Latin character UI.

13. The system of claim 11, wherein the selectable object indicates a shortcut for a user-specified key combination.

14. The system of claim 11, wherein the selectable object indicates a shortcut for a key combination associated with a foreground application.

15. The method of claim 1, wherein the function toolbar is configured to display other function keys when scrolled.

16. The method of claim 1, wherein the function toolbar further comprises an icon for inputting a string of characters.

* * * * *